United States Patent [19]

Ema

[11] Patent Number: 4,688,242
[45] Date of Patent: Aug. 18, 1987

[54] X-RAY IMAGING SYSTEM

[75] Inventor: Takehiro Ema, Ootawara, Japan

[73] Assignee: Kabushiki Kaisha Toshiba, Kawasaki, Japan

[21] Appl. No.: 857,050

[22] Filed: Apr. 29, 1986

[30] Foreign Application Priority Data

Apr. 30, 1985 [JP] Japan ................................. 60-90929

[51] Int. Cl.$^4$ ............................................. G21K 1/00
[52] U.S. Cl. ...................................... 378/154; 378/7;
378/62; 378/99; 378/145; 378/155; 378/147;
358/111
[58] Field of Search ........................ 378/7, 62, 86–87,
378/99, 145, 147, 154, 155; 358/111

[56] References Cited
U.S. PATENT DOCUMENTS 4,549,307 10/1985 Macovski ................................. 378/7

FOREIGN PATENT DOCUMENTS 2452166 5/1976 Fed. Rep. of Germany ..... 378/154

Primary Examiner—Craig E. Church
Assistant Examiner—John C. Freeman

Attorney, Agent, or Firm—Finnegan, Henderson, Farabow, Garrett & Dunner

[57] ABSTRACT

An X-ray imaging system has an X-ray source, an X-ray image detection section, an X-ray mask member, a drive unit, a memory, a calculating section, and an image output unit. An X-ray image is detected by the X-ray image detection section. The X-ray mask member has X-ray shielding regions, distributed in a predetermined pattern, which locally shield the X-ray. The mask member is driven by the drive unit so that it is inserted in or removed from an X-ray radiation field between the X-ray image detection section and the X-ray source, and is sequentially displaced to predetermined positions in the radiation field. The calculating section calculates scattered X-ray intensity distribution data based on a plurality of transmission X-ray data obtained by irradiating an object with X-rays with the mask member located at different positions in the radiation field, and transmission X-ray data obtained by irradiating the object with X-rays with the mask member located outside this field. The calculating section then calculates X-ray image data from the scattered X-ray intensity distribution data and transmission X-ray data obtained with the mask member located outside the radiation field.

9 Claims, 14 Drawing Figures

F I G. 2
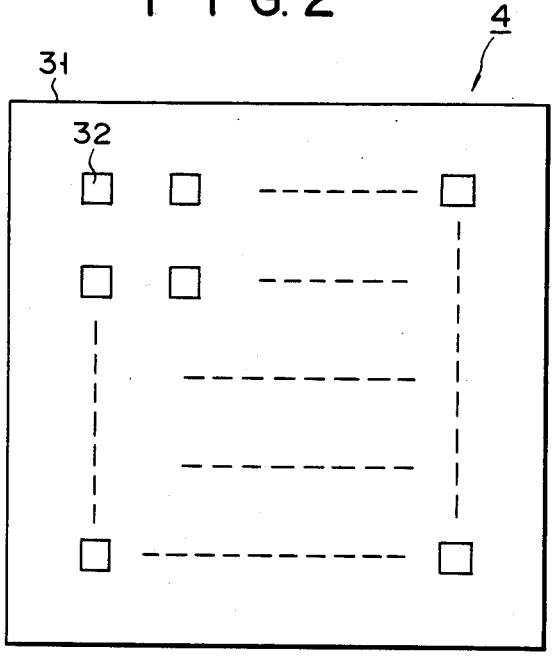
F I G. 3
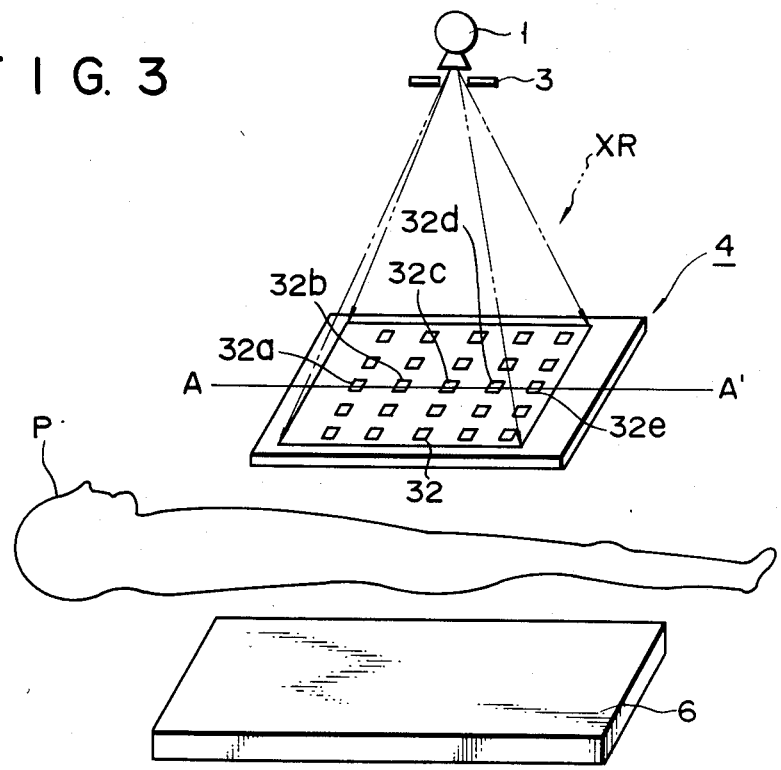

FIG. 6
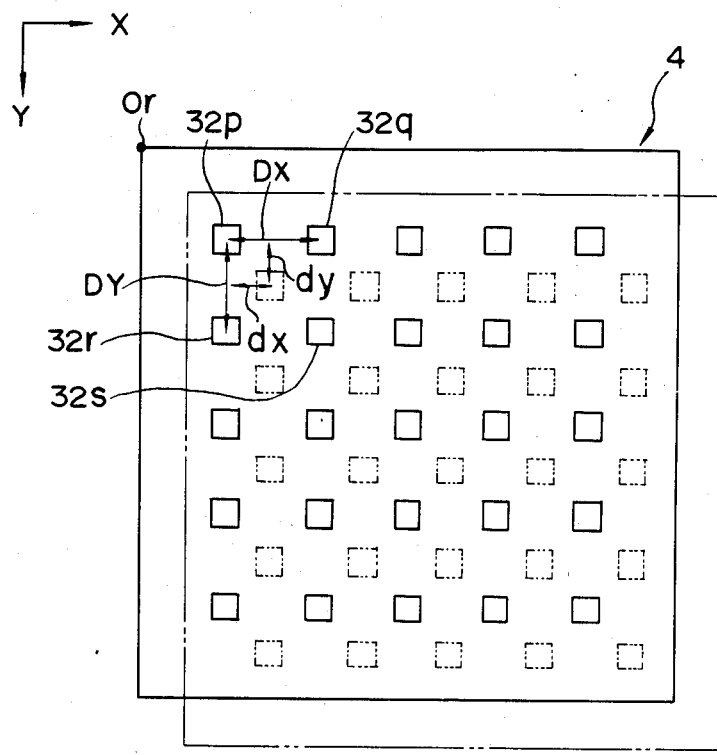
FIG. 7A
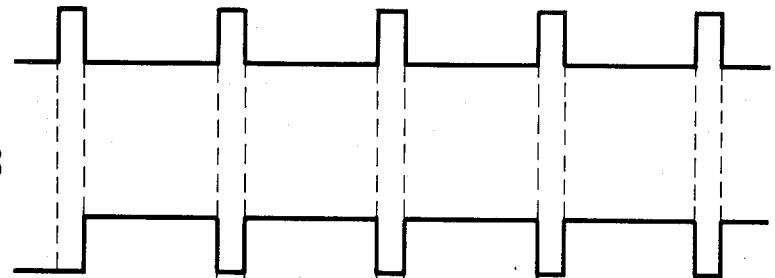
FIG. 7B
FIG. 7C
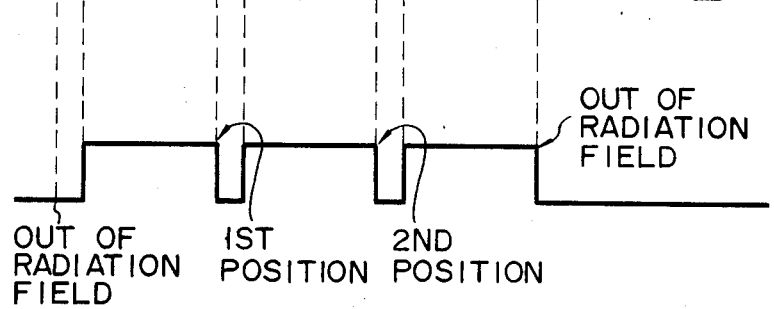

FIG. 8A
FIG. 8B
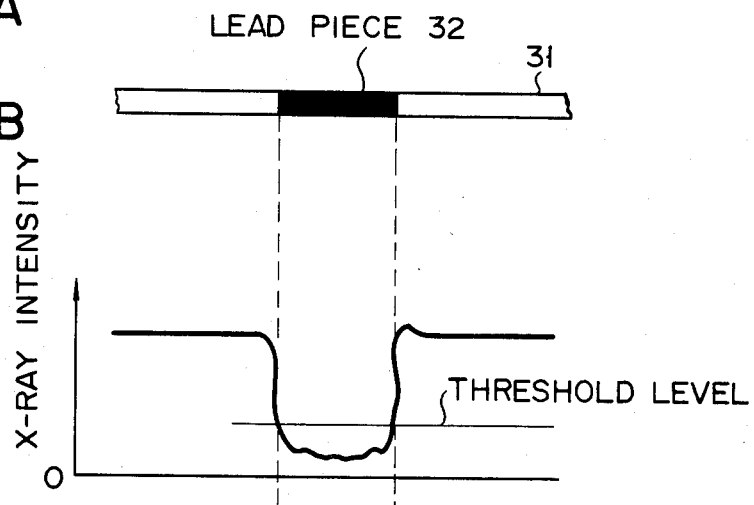
FIG. 8C

X-RAY IMAGING SYSTEM

BACKGROUND OF THE INVENTION

The present invention relates to an X-ray imaging system which irradiates an object with X-rays, and detects X-rays transmitted through the object to obtain transmission X-ray data, thereby forming a visible image based on the transmission X-ray data and, more particularly, to a scattered X-ray elimination technique suitable for a so-called digital radiography apparatus which converts an X-ray image into digital data.

In conventional X-ray imaging systems, a detector for detecting X-rays receives direct X-rays transmitted through an object without being scattered, as well as scattered X-rays scattered by the object. The scattered X-rays are a major factor contributing to the degradation of contrast and sharpness of an X-ray image obtained through the detector. For this reason, in X-ray imaging systems, it is very important to eliminate scattered X-rays.

In order to eliminate scattered X-rays, a grid is usually used in conventional systems. However, since the grid itself generates scattered X-rays, it cannot perform satisfactory elimination of scattered X-rays.

If scattered X-rays can be eliminated, a contrast and sharpness of an X-ray image can be improved, thus providing a good X-ray image. In addition, if an image based on direct X-rays can be obtained, attenuation of the X-rays by the object can be accurately calculated by logarithmic conversion of the image data. Therefore, it is very desirable to eliminate scattered X-rays.

Although various studies have been made on the nature of these scattered X-rays, since X-ray scattering involves complicated phenomena, many aspects thereof still remain unsolved.

SUMMARY OF THE INVENTION

It is an object of the present invention to provide an X-ray imaging system which effectively eliminates scattered X-ray components contained in image data, and which can form an X-ray image of high contrast and sharpness without blurring.

In order to achieve the above object of the present invention, there is provided an X-ray imaging system comprising: an X-ray source for emitting X-rays to be radiated on an object; an X-ray image detection section for detecting an X-ray image emitted from the X-ray source and transmitted through the object; an X-ray mask member, having a plurality of X-ray shielding regions distributed in a predetermined pattern, for locally shielding X-rays with the plurality of X-ray shielding regions; a drive unit for moving the X-ray mask member so that the X-ray mask member is inserted or removed with respect to an X-ray radiation field between the X-ray image detection section and the X-ray source and is sequentially positioned at a plurality of predetermined positions in the X-ray radiation field; a storage section for storing X-ray image data; a first calculating section, associated with the storage section, for calculating scattered X-ray intensity distribution data associated with the object, based on a plurality of transmission X-ray data obtained by irradiating the object with X-rays when the X-ray mask member is located at different positions in the X-ray radiation field, and on transmission X-ray data obtained by irradiating the object with X-rays when the X-ray mask member is located outside the X-ray radiation field; a second calculating section, associated with the storage section, for calculating X-ray image data, from which the influence of scattered X-rays is eliminated, in accordance with the scattered X-ray intensity distribution data obtained by the first calculating section and transmission X-ray data obtained by irradiating the object with X-rays when the X-ray mask member is located outside the X-ray radiation field; and an image output unit for outputting the X-ray image data calculated by the second calculating section as a visible image.

The present invention provides an X-ray imaging system, which can sufficiently eliminate scattered X-ray components contained in the image data and can form an X-ray image of high contrast and sharpness without blurring. More specifically, in the X-ray imaging system of this invention, a plurality of masked X-ray data, produced by an X-ray mask member displaced to different positions in an X-ray radiation field, are subjected to calculation of scattered X-ray intensity distribution, thus greatly improving calculation precision of the scattered X-ray components contained in the image data. Therefore, the scattered X-ray components contained in the image data can be effectively eliminated.

BRIEF DESCRIPTION OF THE DRAWINGS

FIG. 2 is a schematic plan view of an X-ray mask member used in the system in FIG. 1;

FIG. 3 is an illustration for explaining an operation principle of the system in FIG. 1;

FIGS. 5A to 5C and 6 are illustrations for explaining movement of the X-ray mask member of the system in FIG. 1 in an X-ray radiation field;

FIGS. 7A to 7C are timing charts respectively showing an X-ray radiation timing, a readout timing of an X-ray image from a camera, and an operation timing of the X-ray mask member in an X-ray imaging system to which the present invention is applied; and FIGS. 8A to 8C are illustrations for explaining operations of the bilevel quantization.

DETAILED DESCRIPTION OF THE PREFERRED EMBODIMENT

Figure 1:
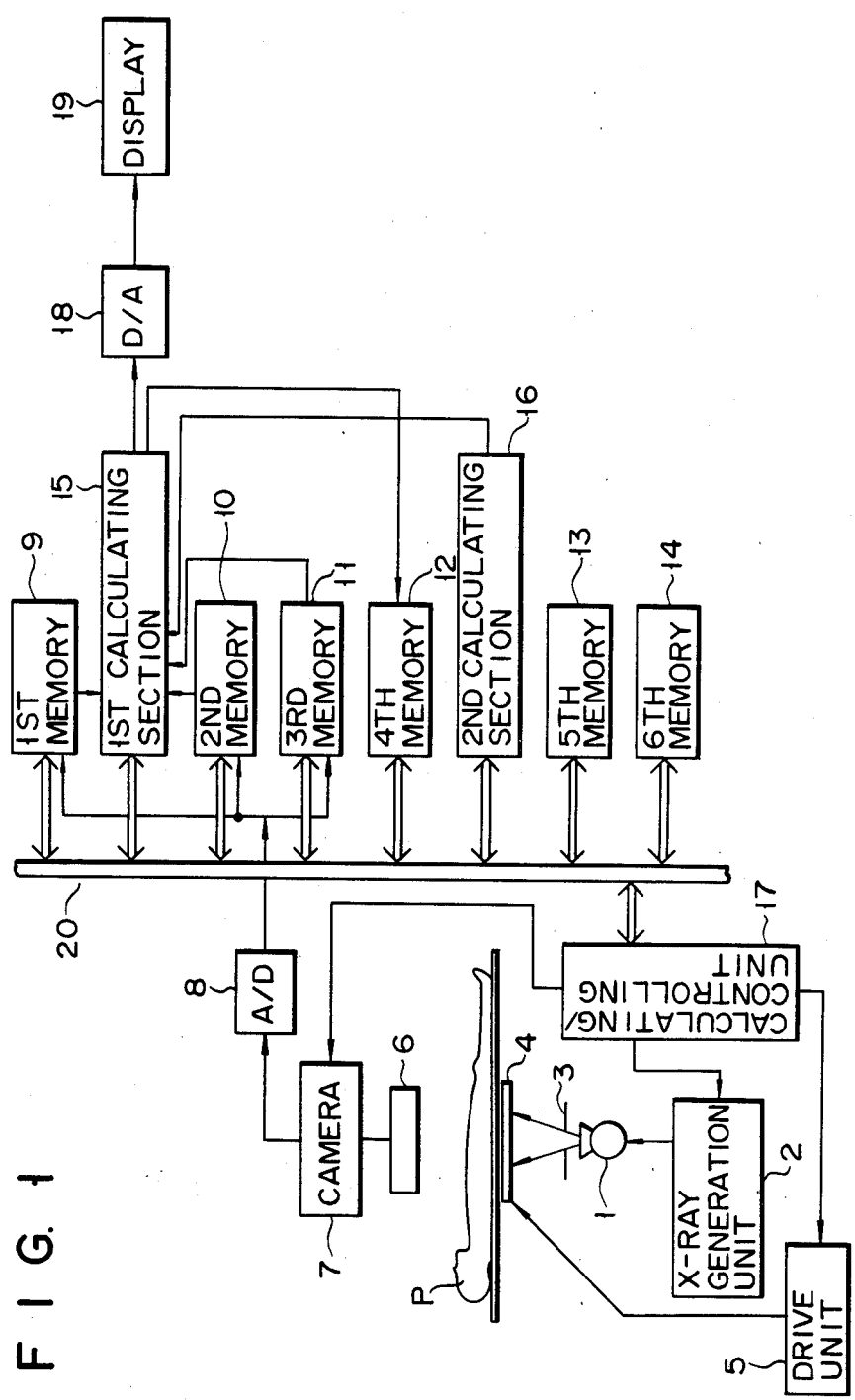
FIG. 1 is a block diagram of an X-ray imaging system according to an embodiment of the present invention.

As shown in the block diagram of FIG. 1, an X-ray imaging system according to an embodiment of the present invention comprises X-ray tube 1, X-ray generation unit 2, collimator 3, X-ray mask member 4, drive unit 5, X-ray image detector 6, camera 7, A/D (analog-to-digital) converter 8, memories 9 to 14, calculating sections 15 and 16, calculating/controlling unit 17, D/A (digital-to-analog) converter 18, display 19, and data bus 20.

When X-ray tube 1 is driven by X-ray generation unit 2, X-rays are emitted from tube 1 toward object (e.g., a patient) P. A radiation field of X-rays emitted from tube 1 is restricted by collimator 3. The X-rays, the radiation field of which is defined by collimator 3, become incident on object P through X-ray mask member 4, which partially shields X-rays.

Mask member 4 comprises X-ray transmitting plate 31 of, e.g., a thin acrylic resin plate having good X-ray transmittance, on which a plurality of small segments (e.g., lead segments) 32 of an X-ray shielding material are attached at equal intervals, as shown in FIG. 2. Each lead segments 32 has a size of 2 mm×2 mm, for example.

Mask member 4 locally shields the X-rays with a predetermined pattern constituted by the plurality of lead segments 32. Mask member 4 is moved by drive unit 5 to be inserted in or removed from the X-ray radiation field. In addition, when member 4 is located in the X-ray radiation field, it can be displaced to different positions therein upon operation of drive unit 5.

X-ray image detector 6 comprises, for example, an image intensifier (I.I.), and detects X-ray image data transmitted through object P to convert it into a visible image. The visible X-ray image obtained by detector 6 is converted into an electrical signal by camera (e.g., TV camera) 7, and is then converted into a digital signal by A/D converter 8.

1st memory 9 stores transmission X-ray data (original image data XO) transmitted through object P when mask member 4 is located outside the X-ray radiation field. 2nd memory 10 stores X-ray image data (first masked X-ray data MA) obtained when mask member 4 is located at a first predetermined position in the X-ray radiation field. 3rd memory 11 stores X-ray data (second masked X-ray data MB) obtained when mask member 4 is located at a second predetermined position in the X-ray radiation field separated from the first predetermined position.

1st calculating section 15 performs subtraction processing of original image data XO stored in 1st memory 9 and first masked X-ray data MA stored in 2nd memory 10 for each corresponding pair of pixels, and stores resultant first subtraction data SA in 4th memory 12. Calculating section 15 also performs subtraction processing of original image data XO and second masked X-ray data MB stored in 3rd memory 11 for each corresponding pair of pixels, and stores resultant second subtraction data SB also in 4th memory 12. Calculating section 15 also performs subtraction processing of original image data XO and scattered X-ray distribution data DS (to be described later) indicating a scattered X-ray intensity distribution for each corresponding pair of pixels, and outputs the processing result to D/A converter 18.

Calculating/controlling unit 17 comprising, e.g., a CPU (central processing unit), controls the operation of the entire system (e.g., the operation of X-ray generation unit 2 for driving X-ray tube 1, drive unit 5 for driving mask member 4, and camera 7, read/write control of all the memories, and the like). Unit 17 calculates a central address for each region shielded with lead segments 32 of mask member 4 (i.e., an X-ray shielding region) in a memory, displacement of the address due to movement of mask member 4, and an average value of X-ray intensity data in the X-ray shielding regions, i.e., scattered X-ray component data.

5th and 6th memories 13 and 14 store transient calculation data from unit 17. 2nd calculating section 16 performs data interpolation using, e.g., a SYNC function, on the basis of data associated with the X-ray shielding regions calculated by unit 17, thus obtaining scattered X-ray distribution data. Various data communication between respective memories and calculating sections is made through data bus 20.

The operation of the system with the above arrangement will now be described.

At the beginning of an imaging operation, mask member 4 is located outside the X-ray radiation field. In this state, unit 17 causes X-ray generation unit 2 to radiate X-rays from X-ray tube 1 toward object P. In synchronism with X-ray radiation, unit 17 controls camera 7 to obtain original image data XO through X-ray image detector 6. Acquired original image data XO is converted into digital data by A/D converter 8, and is written in 1st memory 9.

Next, drive unit 5 is driven under the control of unit 17, so that mask member 4 is moved to a first position in the X-ray radiation field. In this state, X-rays are emitted from X-ray tube 1, and first masked X-ray data MA is acquired by camera 7 through detector 6. Data MA is then written in 2nd memory 10 through A/D converter 8.

The position of mask member 4 is shifted in the same plane to a second position in the X-ray radiation field slightly shifted from the first position. Upon re-radiation of X-rays in this state, second masked X-ray data MB is acquired by camera 7. Data MB is then written in 3rd memory 11 through A/D converter 8.

The relationship between X-ray data MA and MB, written in 2nd and 3rd memories 10 and 11, and mask member 4 will now be described in detail with reference to FIGS. 3 to 6.

Figure 4:
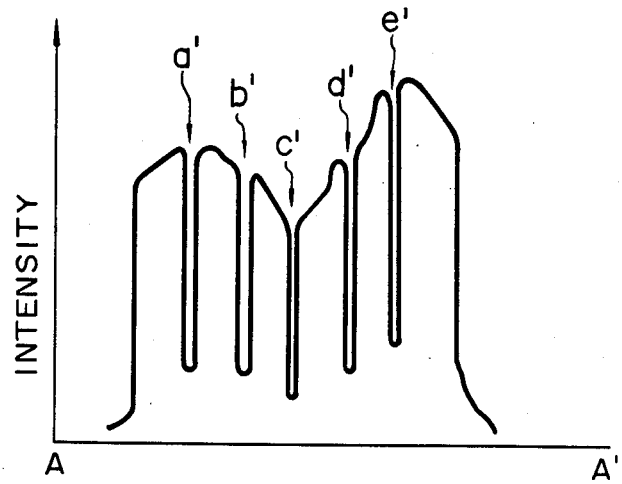
FIG. 4 is a graph showing an X-ray intensity distribution detected when X-rays are radiated in a state shown in FIG. 3.

FIG. 3 is an illustration for explaining acquisition of masked X-ray data, and FIG. 4 is a graph showing an X-ray intensity distribution detected when X-rays are radiated in the state shown in FIG. 3. When X-rays XR are radiated in the state wherein mask member 4 is positioned in the X-ray radiation field, an X-ray intensity distribution of masked X-ray data along line A—A' detected by detector 7 is as shown in FIG. 4. The X-ray intensity distribution in FIG. 4 shows steep dips at positions indicated by a', b', c', d', and e'.

These dips represent that X-ray XR is locally shielded by lead segments 32 (i.e., segments 32a, 32b, 32c, 32d, and 32e) along line A—A'. Although X-ray XR is shielded by lead segments 32a, 32b, 32c, 32d, and 32e, values at distal ends of the dips are not zero because scattered X-rays are detected. Thus, level and distribution of the scattered X-ray components can be calculated from the values of the dips. In this calculation, as the number of dips, i.e., the number of lead segments 32 provided in mask member 4, increases, detection precision of the scattered X-ray components can be improved. However, if the number of dips, i.e., the number of lead segments 32, is too large, the amount of X-rays shielded by segments 32 increases, and the amount of X-rays transmitted through object P and landing on detector 6 therefore decreases, resulting in a smaller amount of scattered X-ray component data than actually exists. In theory, as the number of X-ray shielding regions included in an imaging region increases, more effective scattered X-ray component data could be obtained. However, in practice, a distribution density of the X-ray shielding regions must be set below a given level. Alternatively, the size of segments 32 can be reduced. However, in order to allow detection of the dips, segments 32 cannot be smaller than a given size.

Because, as seen from FIG. 8B, in general, the waveform of the X-ray intensity signal is distorted and stretched. It is therefore necessary to distinguish the desirable signal belonging to the X-ray shielded portion (i.e., the scattered X-ray signal) from the signal belonging to the other portion (i.e., the primary X-ray signal and a part of the scattered X-ray signal). Therefore, as seen FIG. 8A to 8C, the X-ray intensity data of the portion which is not shielded by the lead piece 32 has a higher level than the threshold level and is converted into the digital "0" level signal. The X-ray intensity data of the portion which is shielded by the lead piece 32 has a lower level than the threshold level and is converted into the digital "1" level signal. This bilevel quantization is carried out in 1st calculating section 15.

In the system of this embodiment, instead of increasing the number of segments 32, X-ray mask member 4 is displaced to, e.g., two different positions in the X-ray radiation field, and X-ray data MA and MB are obtained during respective X-ray radiations at the two positions, thereby providing the same effect as when the number of segments 32 is increased.

Figure 5A:
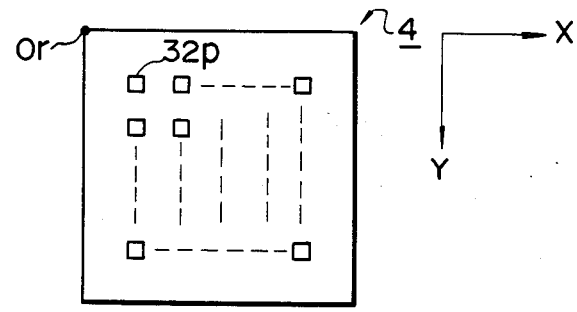
Figure 5B:
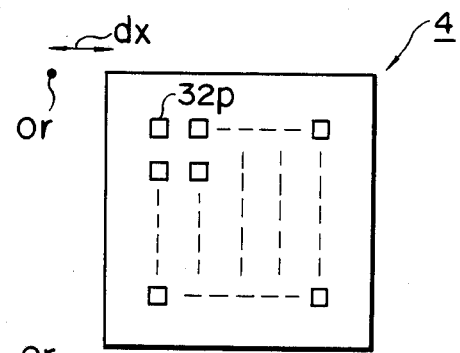
Figure 5C:
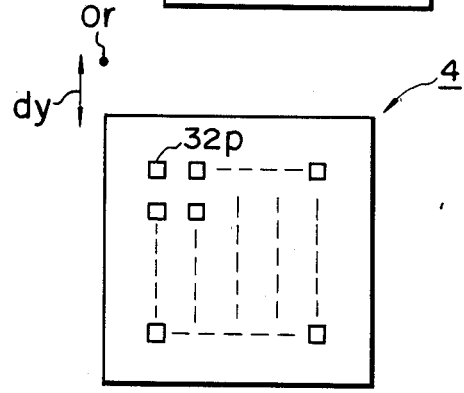

FIGS. 5A to 5C and FIG. 6 are illustrations for explaining movement of mask member 4 in the X-ray radiation field in the system of this embodiment. If mask member 4 in a state shown in FIG. 5A is parallel-moved by distance dx in the X direction, a state shown in FIG. 5B is obtained. Assuming that the coordinates of lead segment 32p in FIG. 5A are (x, y), those in FIG. 5B are (x+dx, y). If mask member 4 in the state in FIG. 5A is parallel-moved by distance dy in the Y direction, a state shown in FIG. 5C is obtained, and the coordinates of segment 32p are (x, y+dy). X- and Y-movements can be freely combined. FIG. 6 illustrates the position of member 4 before and after it is moved in the X and Y directions by distances dx and dy, respectively, when these movements overlap each other. Referring to FIG. 6, after the two parallel-movements, the coordinates (x, y) of segment 32p before the movements are changed to be (x+dx, y+dy). When member 4 is moved by distance DX in the X direction, the coordinates of segment 32p are the same as they were before the movements. Therefore, the amount of movement in the X direction can be smaller than distance DX and that in the Y direction can be smaller than distance DY, so that the coordinates of segment 32p are the same as those of lead segment 32r before the movements. Within this limited range, segment 32p can be moved to any location encompassed by segments 32p, 32q, 32r, and 32s, and the object of this embodiment can be satisfactorily achieved thereby.

Masked X-ray data MA and MB acquired by displacing mask member 4 to different positions as above are subjected to subtraction with original image data XO.

1st calculating section 15 executes subtraction processing of original image data XO stored in memory 9 and X-ray data MA stored in memory 10 for each corresponding pair of pixels. The subtraction result (i.e., subtraction data SA) from section 15 is then stored in memory 12.

Calculating/controlling unit 17 calculates central addresses of the X-ray shielding regions in X-ray data MA, and scattered X-ray component data corresponding to the respective X-ray shielding regions in accordance with subtraction data SA stored in memory 12. The data is then written in memory 13. This data will be referred to as X-ray shielding region data AA hereinafter.

Calculating section 15 also executes subtraction processing of original image data XO and X-ray data MB stored in memory 11. The subtraction result (i.e., subtraction data SB) from section 15 is also stored in memory 12.

Unit 17 calculates central addresses of the respective X-ray shielding regions in data MB, and scattered X-ray component data corresponding to the respective X-ray shielding regions in accordance with subtraction data SB stored in memory 12. The data from unit 17 is then stored in memory 14. This data will be referred to as X-ray shielding region data AB hereinafter.

Unit 17 calculates a distance between the central addresses of the X-ray shielding regions (i.e., displacement of member 4) based on data AA and AB respectively stored in memories 13 and 14, and outputs the result to 2nd calculating section 16 together with data AA and AB.

Calculating unit 16 executes data interpolation using a SINC function based on the output data from unit 17, thus obtaining scattered X-ray distribution data indicating the scattered X-ray intensity distribution. The scattered X-ray distribution data is then supplied to section 15 to be subjected to subtraction processing with original image data XO stored in memory 9. After the subtraction processing, the scattered X-ray components contained in original image data XO can be eliminated, and image data corresponding to an image formed only by direct X-ray components can be obtained. The image data is then supplied to display 19 through D/A converter 18, to be displayed as an image. Since the image displayed on display 19 is free from the influence of scattered X-rays, it has high contrast and sharpness.

Note that the scattered X-ray distribution data is subtracted from original X-ray data XO stored in memory 9 by section 15. Alternatively, after acquiring the masked X-ray data, X-ray radiation can be performed while mask member 4 is located outside the X-ray radiation field, so as to obtain transmission X-ray data. The transmission X-ray data is used instead of original image data XO, and the above subtraction can be performed. Once the scattered X-ray distribution data is obtained, it can be used to eliminate the scattered X-ray components from transmission X-ray data during the subsequent X-ray radiation as long as the position or size of the X-ray radiation field or X-ray radiation conditions remain substantially the same.

FIGS. 7A to 7C respectively show timings of X-ray radiation, image detection of detector 6, and movement of mask member 4. In this embodiment, camera 7 comprises a vidicon TV camera having an accumulation type target. X-ray tube 1 radiates X-ray pulses at equal time intervals, as shown in FIG. 7A. A transmission X-ray image accumulated on the target of camera 7 through detector 6 during the X-ray radiation is read out during an interval between two X-ray radiations, as shown in FIG. 7B. Mask member 4 is moved during such an interval, i.e., during the readout interval of camera 7. In this case, when member 4 is located outside the radiation field, a first X-ray radiation is performed to acquire original image data XO. During the readout interval of data XO from camera 7, mask member 4 is moved to a first position in the radiation field. After this movement, a second X-ray radiation is performed to acquire masked X-ray data MA. During the readout interval of data MA from camera 7, mask member 4 is moved to a second position in the radiation field. After completion of the movement, a third X-ray radiation is performed to acquire masked X-ray data MB. During the readout interval of data MB from camera 7, mask member 4 is moved outside the radiation field. The scattered X-ray distribution data is calculated after the above sequence. Transmission X-ray data obtained from repetitive X-ray radiation can be corrected with the same scattered X-ray distribution data unless a position or direction of the object, a position or size of the radiation field, and X-ray radiation conditions are greatly changed.

Masked X-ray data MA and MB need only provide positions and values of dips caused by the X-ray shielding regions, and the number of X-ray shielding regions of member 4 can be reduced because member 4 itself is displaced. Even if data MA and MB, subtraction data SA and SB, and X-ray shielding region data AA and AB corresponding thereto express 1-frame image data in a smaller (rougher) matrix size than that of original image data, detection precision will substantially not be degraded. Therefore, the capacities, per frame of an image, of memories 10 to 14 for storing data MA, MB, SA, SB, AA, and AB can be smaller than that of memory 9. If original image data is constituted by 512×512 pixels, data MA, MB, SA, SB, AA, and AB can often be expressed by 128×128 or 256×256 pixels. In this case, the correspondence between pixels of the respective image data must be corrected during the above calculations.

With the system of this embodiment, scattered X-ray distribution data is obtained based on X-ray shielding data acquired when mask member 4 is located in the X-ray radiation field, and scattered X-ray components contained in the original image data are eliminated through subtraction processing of the scattered X-ray distribution data and the original image data, thus displaying an image of high contrast and sharpness. In particular, the system can provide the same effect as when the number of lead segments 32 is increased, since a plurality of masked X-ray data acquired when mask member 4 is at different positions in the X-ray radiation field are combined. Therefore, measurement precision of the scattered X-ray component distribution can be improved without increasing the number of segments 32.

The present invention has been described in connection with a particular embodiment. However, the present invention is not limited to the above embodiment, and various changes and modifications may be made within the spirit and scope of the invention.

For example, in the above embodiment, movement of mask member 4 (i.e., displacement thereof into, from, or within the X-ray radiation field) is performed through drive unit 5 under the control of unit 17. However, mask member 4 can be moved manually.

In the system of the above embodiment, original image data is acquired when mask member 4 is out of the X-ray radiation field, and X-ray shielding region data is then acquired when it is inside the field. However, the X-ray shielding region data can be obtained first, and thereafter, the original image data can be obtained.

What is claimed is:
1. An X-ray imaging system comprising:
 an X-ray source for emitting X-rays to be radiated on an object;
 X-ray image detection means for detecting an X-ray image emitted from said X-ray source and transmitted through said object;
 X-ray mask means, having a plurality of X-ray shielding regions distributed in a predetermined pattern, for locally shielding X-rays with said plurality of X-ray shielding regions;
 drive means for moving said X-ray mask means so that said X-ray mask means is inserted or removed with respect to an X-ray radiation field between said X-ray image detection means and said X-ray source and is sequentially positioned at a plurality of predetermined positions in said X-ray radiation field;
 storage means for storing X-ray image data;
 first calculating means, associated with said storage means, for calculating scattered X-ray intensity distribution data associated with said object based on a plurality of transmission X-ray data obtained by irradiating said object with X-rays when said X-ray mask means is located at different positions in said X-ray radiation field, and on transmission X-ray data obtained by irradiating said object with X-rays when said X-ray mask means is located outside said X-ray radiation field;
 second calculating means, associated with said storage means, for calculating X-ray image data, from which the influence of scattered X-rays is eliminated, in accordance with the scattered X-ray intensity distribution data obtained by said first calculating means and transmission X-ray data obtained by irradiating said object with X-rays when said X-ray mask means is located outside said X-ray radiation field; and
 image output means for outputting the X-ray image data calculated by said second calculating means as a visible image.

2. A system according to claim 1, wherein said X-ray mask means is an X-ray mask member comprising a plate of an X-ray transmitting material, on which a plurality of X-ray shielding segments are adhered.

3. A system according to claim 2, wherein said X-ray shielding segments are lead segments.

4. A system according to claim 1, wherein said drive means is means for automatically moving said X-ray mask means to be interlocked with said X-ray source and said X-ray image detection means.

5. A system according to claim 1, wherein said X-ray image detection means includes X-ray/photo conversion means for converting X-ray data into visible image data, and camera means for converting an output image from said X-ray/photo conversion means into an electrical signal.

6. A system according to claim 5, wherein said X-ray/photo conversion means is an image intensifier.

7. A system according to claim 1, wherein said first calculating means calculates said scattered X-ray intensity distribution data with the use of an interpolation calculation technique utilizing a SINC function.

8. A system according to claim 1, wherein said first calculating means has means for identifying whether or not present transmission X-ray intensity data masked by said X-ray mask means is said scattered x-ray intensity data, in accordance with whether or not the intensity data exceeds a predetermined threshold level.

9. A system according to claim 1, wherein said storage means is a means having a memory area for transmission X-ray data obtained when said X-ray mask means is located in said X-ray radiation field which memory area is smaller per one frame than a memory area for transmission X-ray data which is obtained when said X-ray mask means is located outside the X-ray radiation field.

* * * * *